Feb. 3, 1959  F. M. ROWLES  2,871,872
AUTOMATIC SAFETY CONTROL SYSTEM FOR VEHICLES
Filed April 3, 1956  3 Sheets-Sheet 1
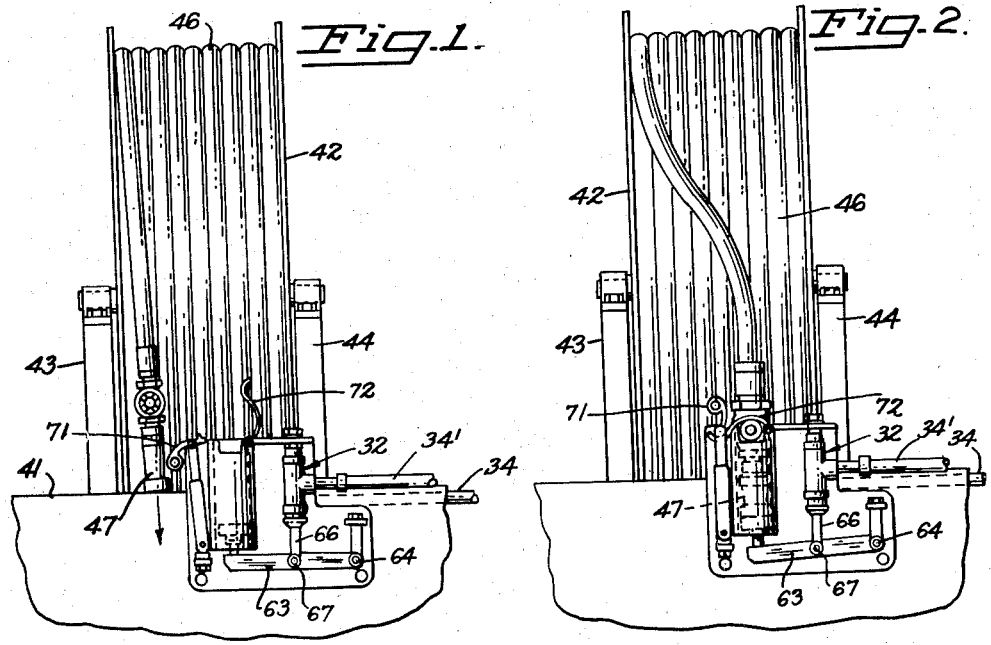
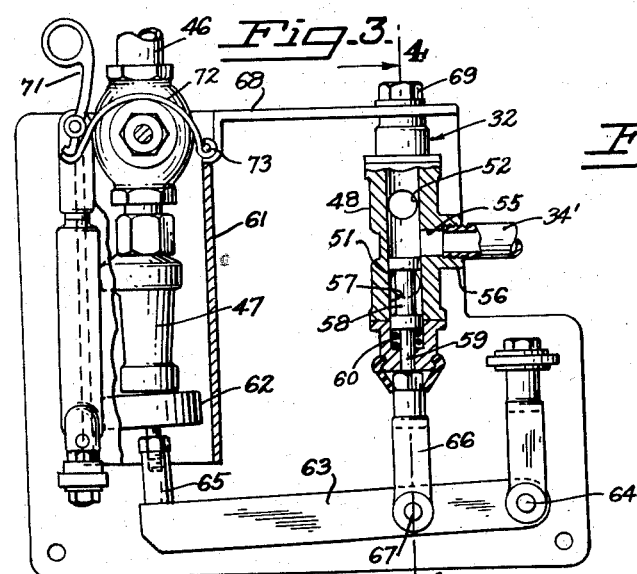
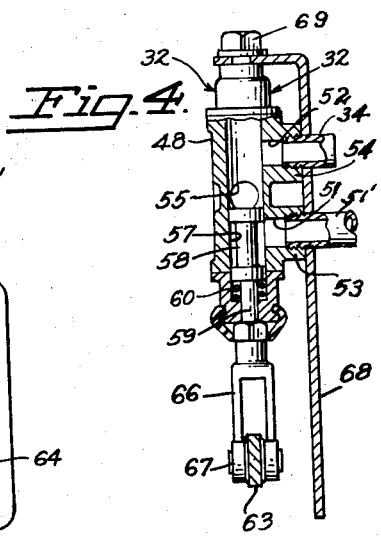
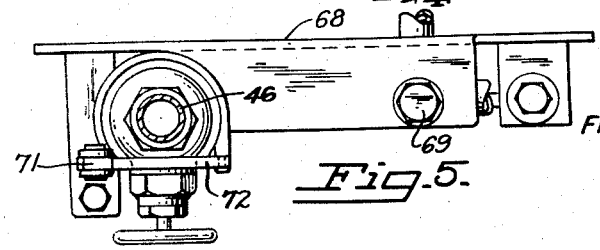
INVENTOR.
FRANKLIN MORRIS ROWLES
BY
ATTORNEY Feb. 3, 1959 F. M. ROWLES 2,871,872
AUTOMATIC SAFETY CONTROL SYSTEM FOR VEHICLES
Filed April 3, 1956 3 Sheets-Sheet 2
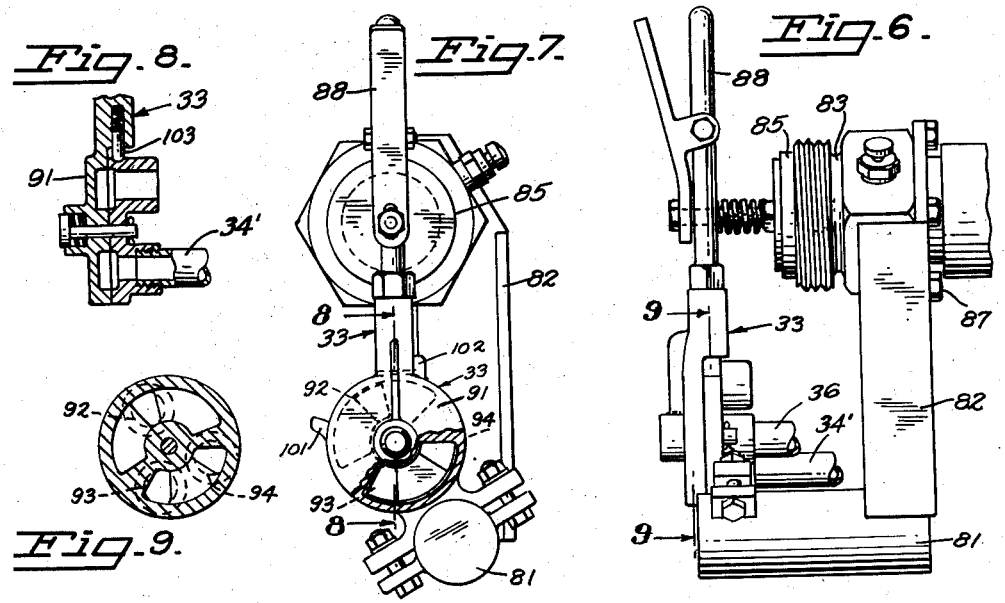
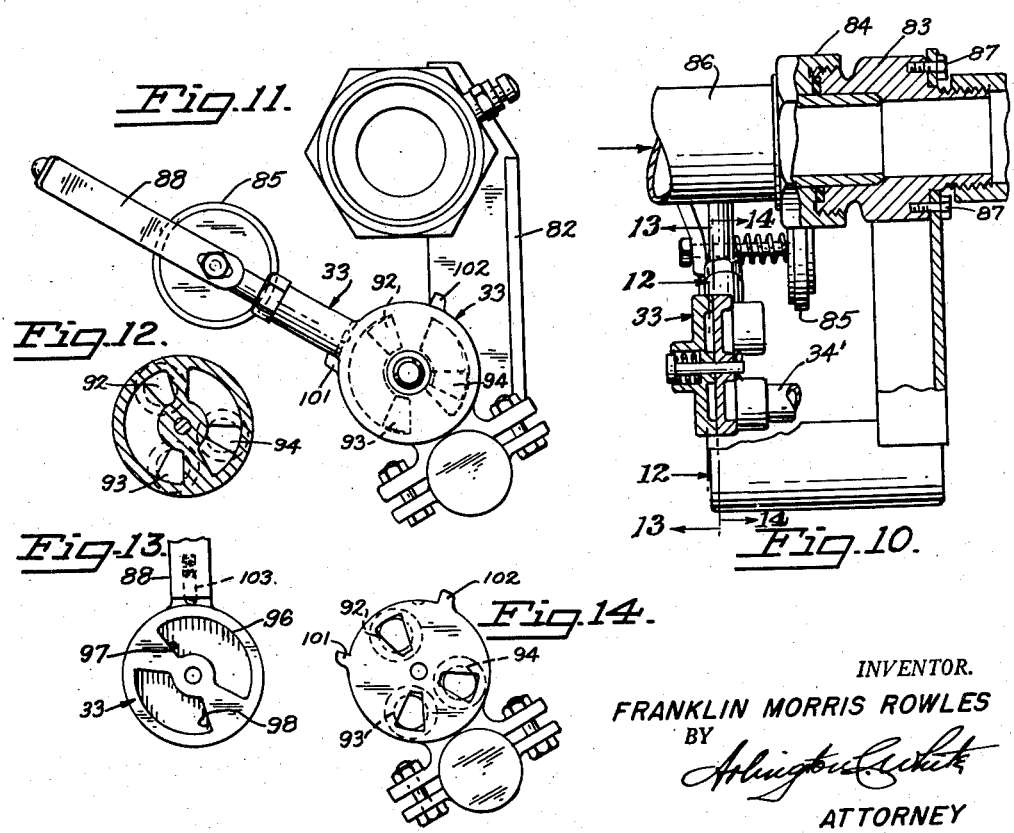
INVENTOR.
FRANKLIN MORRIS ROWLES
BY
ATTORNEY

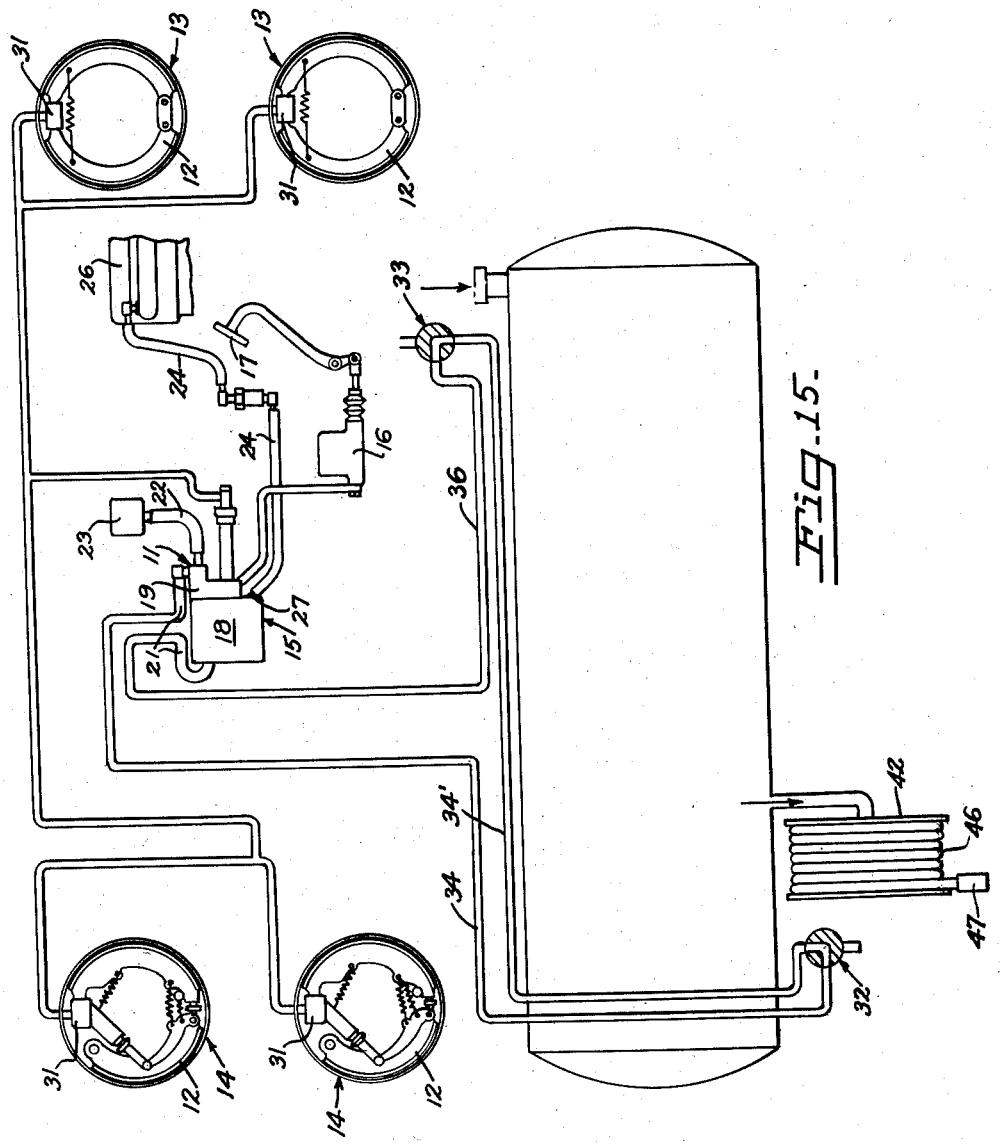

United States Patent Office 2,871,872
Patented Feb. 3, 1959

2,871,872

AUTOMATIC SAFETY CONTROL SYSTEM FOR VEHICLES

Franklin Morris Rowles, Sacramento, Calif., assignor to Cal-Gas Equipment Corp., Sacramento, Calif., a corporation of California Application April 3, 1956, Serial No. 575,745

5 Claims. (Cl. 137—351)

The invention, in general, relates to devices for preventing the release of the brakes of a vehicle under certain conditions. More particularly, the invention relates to an improved safety control system automatically operable for holding the brakes of a vehicle in maximum applied position until after the performance of a specific action on the part of the vehicle operator which insures against the likelihood of damage to property and injury to persons in the vicinity of the vehicle.

While the present invention is entirely suitable for application to a variety of different types of vehicles to meet a wide variety of conditions for the promotion of safety in and about a vehicle, the invention has principally been devised for application to tank trucks employed for hauling and delivering inflammable fluid, such as gasoline, liquefied petroleum gas and other fuels, for obviating the hazards of fires. Accordingly, and solely for the purposes of explanation and in the interest of brevity, the invention will herein be illustrated and described in that environment.

Heretofore in the art of safety devices applicable to the brake system of tank trucks and the like, means have been developed which prevent the operation of the engine or other prime mover of the vehicle while the brakes are in an applied position and while tank loading and tank unloading hoses are connected to a source of supply or to a point of delivery of fuel. These means are somewhat unsatisfactory, especially where the vehicle prime mover is relied upon and used for driving a pump for filling the tank of the truck and, in some instances for unloading the truck. Other contrivances, such as chock blocks applied against the vehicle wheels, together with chains connected to the blocks, as well as to the couplings of the loading and unloading hoses, have been employed to prevent movement of the vehicle until the hoses have been disconnected but such contrivances are subject to the disadvantages that the chock blocks accidentally become dislodged and the vehicle will move while hoses are being connected or disconnected, notwithstanding some brake application, and often resulting in loss of large quantities of fuel and increased fire hazards. The present invention is directed to a system obviating disadvantages of prior devices of this nature and providing for the maintenance of vehicle brakes in an applied condition until after the hazards of fire or fuel loss when loading or unloading fuel from tanks have been eliminated.

A primary object of my invention is to provide an improved automatic safety control system for vehicles which affords the maintenance of a positive application of vehicle brakes at maximum capacity until fuel tank loading or unloading hoses have been disconnected and replaced in their normal carrying positions on the truck.

Another important object of the present invention is to provide an improved automatic safety control system for tank trucks of the indicated nature which is additionally characterized by the positive action of the control both as to maintenance of brakes in a fully applied position, as well as to the placement of the brake system in condition for the movement of the vehicle at the will of the operator after loading or unloading hoses have been disconnected and have been replaced in their normal positions on the vehicle.

A still further object of the invention is to provide an automatic safety control system for trucks which insures against run-away accidents occurring from slippage or accidental release of the vehicle's emergency brake.

Another object of my present invention is to provide a control system of the aforementioned character which incorporates a nozzle holding clamp for obviating fire hazards resulting from the dislodgment of unloading hose nozzles from conventional platform trays presently used for disposition of such nozzles, and resulting from the dragging of such nozzles along the roadway behind the vehicle.

A still further object of my present invention is to provide an improved automatic safety control system of the indicated nature which is additionally characterized by its simplicity of installation on a tank truck for coaction with existing braking systems of the vehicle; which requires but little maintenance; and which can be assembled and installed at a minimum of expense.

Other objects of the invention, together with some of the advantageous features thereof, will appear from the following description of a preferred embodiment of the invention which is illustrated in the accompanying drawings. It is to be understood, however, that I am not to be limited to the precise system disclosed, nor to the precise arrangement of the various elements thereof, as my invention, as defined in the appended claims, can be embodied in a plurality and variety of forms.

Referring to the drawings:

Fig. 1 is a front elevational view, partly in fragmentary illustration, of certain elements of a preferred embodiment of the invention as installed on a tank truck at a fuel delivery point; this view showing the elements in a position for delivery of fuel from the tank of the truck and with the truck brakes fully applied.

Fig. 2 is a front elevational view similar to Fig. 1 but with the elements arranged in tank truck carrying position with the truck brakes released so that the vehicle can travel normally and with safety.

Fig. 3 is an enlarged view of the lower right-hand portion of Fig. 2, with the valve illustrated partially in sectional elevation.

Fig. 4 is a view taken on the line 4—4 of Fig. 3.

Fig. 5 is a top plan view of the elements shown in Fig. 3.

Fig. 6 is a side elevational view of certain elements at the tank loading end of a tank truck forming parts of a preferred embodiment of the invention.

Fig. 7 is a front elevational view of the elements shown in Fig. 6.

Fig. 8 is an enlarged sectional detail taken on the line 8—8 of Fig. 7.

Fig. 9 is a sectional detail taken on the line 9—9 of Fig. 6.

Fig. 10 is a view similar to Fig. 6 but with the valve handle turned to a loading position; this view showing in fragmentary view a portion of a loading hose coupled to the inlet of the tank of the truck.

Fig. 11 is a front elevational view of the elements shown in Fig. 10 with the valve handle moved to an "off" position.

Fig. 12 is a sectional detail taken on the line 12—12 of Fig. 10.

Fig. 13 is a sectional detail taken on the line 13—13 of Fig. 10.

Fig. 14 is a detail of the valve, this view taken on the line 14—14 of Fig. 10.

Fig. 15 is a diagrammatic flow sheet of a preferred embodiment of the invention as applied to a fuel truck.

In its preferred form, the automatic safety control system of my present invention as applied to a fuel truck including a tank having an inlet and an outlet, preferably comprises, in combination with the vacuum booster of the braking system of said truck, a loading hose detachably connected to said inlet, an unloading hose connected to said outlet for detachable connection to the inlet of a fuel depositary, together with a pair of valves for automatically rendering said vacuum booster operative and inoperative, said valves being so mounted and arranged on said truck in relation to said tank inlet and tank outlet that said hoses cannot be connected for loading said tank or unloading from said tank unless said valves have been moved so as to render said vacuum booster operable and said brakes applied to full capacity; nor can said truck be moved after a loading or unloading operation until said hoses have been disconnected and said valves have been returned to their initial positions with said vacuum booster inoperative, thereby eliminating all likelihood of fire hazards by reason of movement of said truck while said hoses are connected for either loading or unloading operations, or while an unloading hose is in a dragging position behind the truck.

As particularly illustrated in Fig. 15 of the annexed drawings, my improved system is associated with the conventional booster, generally designated by the reference numeral 11, which is customarily installed upon trucks of various kinds and particularly on fuel trucks which are employed to haul and deliver such fuels as gasoline, liquefied petroleum gas and the like. As is perhaps well-known, such vacuum booster supplies additional power for application to the brakes 12 of the front and rear wheels 13 and 14, respectively, of a truck and usually is combined with an hydraulic braking system, known as "hydrovac" and designated generally by the reference numeral 15. The hydraulic braking system includes a master cylinder 16, the piston of which is actuated by the brake pedal 17 of the vehicle, a hydrovac including a power cylinder 18, a vacuum cylinder or chamber 19 communicating with the power cylinder at the rear of its piston through pipe connection 21, an air intake conduit 22 to the vacuum chamber 19, including an air filter 23, together with a valve-controlled pipe connection 24 leading from the intake manifold 26 of the engine to the power cylinder 18 to supply vacuum pressure from the intake manifold to the vacuum line and thereover to the vacuum connection 27 on the power cylinder and thence to the vacuum chamber 19. In addition, of course, conduits are provided for conducting the hydraulic fluid from the master cylinder 16 to the wheel cylinders 31 for braking pressure. As is well-known, the opening of the atmospheric valve in the control valve assembly in the vacuum chamber 19 will admit additional air to the power cylinder 18, through pipe connection 21, causing an additional movement of the power cylinder piston which, in turn, forces the piston of the brake hydraulic cylinder 16 farther down, thereby increasing the fluid pressure applied to the wheel cylinders 31 for increased braking.

In accordance with the present invention, means are provided for automatically opening and closing the vacuum booster lines of the braking system of a fuel truck thereby, in the one instance, rendering the vacuum booster inoperative and permitting movement of the truck and, in the other instance of closing the vacuum booster lines, to render the vacuum booster operative to prevent movement of the truck. These means are so arranged for coaction with the braking system of the truck that during a fuel loading or a fuel unloading operation with loading and unloading hoses connected for either of the aforesaid operations, the brakes are set at full capacity and the truck cannot be moved until the hoses are completely disconnected and restored to their carrying positions on the truck for normal truck movement. To this end, and as illustrated in the annexed drawings, I provide a pair of valves 32 and 33 and connect such valves into the vacuum booster 15 by means of a series of conduits 34, 34' and 36; the lines 34 and 36 establishing communication between the valves 32 and 33, respectively, and the pipe connection 21 of the vacuum booster and the conduit 34' establishing communication between the two valves. Each of the valves 32 and 33 comprises a two-way valve including a valve body having three ports of which one is open to the atmosphere. Each valve includes an actuatable valve element for selectively establishing communication, in the one instance of an opened vacuum booster, between the pipe connection 21 and the atmosphere through the valves, and in the other instance of a closed vacuum booster, between the pipe connection and through the valves back to the pipe connection 21 as a closed circuit. In the latter instance, the truck brakes are set for full capacity application, while in the former instance, the truck brakes are released and the truck can be moved after releasing the emergency brake.

With particular reference to Figs. 1 to 5, inclusive, of the annexed drawings which depict a portion of a fuel truck at a fuel delivery location or fuel tank outlet, it will be observed that the valve 32 is mounted on a delivery platform 41 of the truck just below a reel 42 which is journaled in bearings carried by spaced standards 43 and 44 and about which a delivery hose 46 is trained; the delivery hose including a standard valve-controlled nozzle 47, as shown in Figs. 1 and 3. Both of the two-way valves 32 and 33 are conventional and are not claimed herein as my invention, per se. The valve 32 comprises a valve body 48 formed with two ports 51 and 52 in one face thereof; such ports being defined by threaded bosses 53 and 54, respectively, which are formed integral with the body 48. Port 51 communicates with the atmosphere through a conduit 51' which is detachably connected to threaded boss 53, while port 52 of the valve body communicates with pipe connection 21 of the vacuum booster 15 through conduit 34 which is detachably connected to the threaded boss 54. Valve body 48 includes a third port 55 in another face thereof which is defined by threaded boss 56 formed integrally with body 48, and conduit 34' is detachably connected with the valve at boss 56 to establish communication between valve 32 and valve 33 as a part of a closed fluid circuit.

As shown particularly in Figs. 3 and 4 of the annexed drawings, valve 32 is formed with a longitudinally extending bore 57 in which a spring-loaded valve element 58 is slidable between two extreme positions for selectively establishing fluid communication between the pipe connection 21 of vacuum booster 15 and either the atmosphere or through both of the valves 32 and 33. Valve element 58 is carried on a valve stem 59 and seats in one extreme position on a spring 60 which is confined between the valve element and one end of the bore 57; the valve stem 59 extending through the adjacent end of body 48 for connection to linkage hereinafter described. While the valve element can be actuated and moved between its two extreme positions within the bore 57 of valve body 48 by any suitable means, I preferably combine with the valve 32 for actuating its valve element 58, as well as for other purposes hereinafter described, a receptacle 61 in which a pad or seat 62 is movably suspended by means of linkage connected to the valve element stem 59 so that when the seat 62 is allowed to rise by removal of a weight thereon the valve stem 59, together with the valve element 58, is caused to rise to one of its two extreme positions under the influence of the spring 60. Conversely, when the seat or pad 62 in receptacle 61 is depressed by the placement of a weight thereon, such as by disposing the nozzle 47 of the unloading hose 46 thereon and clamping the nozzle down, the linkage connecting the pad 62 to the valve element 58 will draw the valve element down to its other extreme position with spring 60 compressed. When the valve element 58 rises to its one extreme position within the valve body 48, which automatically occurs whenever the unloading hose nozzle 47 is removed from receptacle 61, the vacuum booster automatically closes to effect full capacity application of the truck brakes and the brakes remain under full capacity application during the entire period that the unloading hose nozzle 47 remains out of the receptacle 61 and off the pad or seat 62 therein. And, consequently, the vehicle or truck cannot be moved. When the valve element 58 is moved to its other extreme position, which automatically occurs when the unloading hose nozzle 47 is placed on the seat 62 of receptacle 61 and clamped in position, the vacuum booster automatically opens and brake application is removed so that the truck may be moved upon release of the emergency brake. As shown, the above-referred to connecting linkage between the seat 62 of receptacle 61 and the valve element 58 of valve 32 conveniently comprises a main link 63 fulcrumed at 64 for pivotal movement about that point, together with a hollow stem 65 on one end of the link 63 and in which the pad or seat 62 is removably-mounted, as well as a bifurcated link 66 pivotally connected at its one end to the main link 63 by means of pivot pin 67 and connected at its other end to the valve stem 59. The receptacle 61 is firmly secured in predetermined spaced relationship with respect to the valve 32 by a suitable frame 68 bolted at 69 to the valve body 48, as well as bolted to the platform 41.

As indicated by the showings of Figs. 1 and 2 of the annexed drawings, the nozzle 47 of the unloading hose 46 is removably disposed within receptacle 61 and the weight of the hose nozzle is utilized for effecting the actuation of valve element 58 of valve 32 to control the opening and closing of the vacuum booster of the truck braking system. Releasable means are provided for holding down the nozzle 47 on the seat or pad 62 within the receptacle 61; such means conveniently comprising a trip-lever 71 which is pivotally mounted on the link which is in turn, pivotally mounted on the frame 68. In a clamp latching position, an end of the trip-lever 71 engages the curved, free end of a spring clamp 72 which is pivotally mounted by means of a pin 73 on the top of the receptacle 61. Thus, with the nozzle 47 disposed within the receptacle 61 and resting on pad 62 and with the spring clamp 72 overlying a section of the nozzle and with its free end held down by the trip-lever 71, the entire weight of the nozzle is brought to bear upon pad 62 thereby to hold the valve element 58 of valve 32 in a position to cause port 51 of the valve to be covered so that the vacuum booster is open. In other words, with the nozzle 47 disposed and clamped into the receptacle 61, the vacuum booster 15 is open and will continue to remain open until the nozzle 47 is withdrawn from the receptacle. The normal or truck carrying position of nozzle 47 is illustrated in Fig. 2, and the withdrawn position of nozzle 47 is illustrated in Fig. 1. To effect withdrawal of the nozzle 47 from the receptacle 61, it is only necessary to pivot the trip-lever 71 to disengage it from the spring clamp 72 which is then turned on its pivot to the position shown in Fig. 1, and thereafter withdraw the nozzle 47 from the receptacle, again as shown in Fig. 1. The length of hose 46 can then be unwound from its reel 42 to an extent desired for connecting the nozzle 47 to a connection at a fuel depositary for unloading the desired contents from the tank of the truck. Immediately upon the withdrawal of the nozzle 47 from the receptacle 61, the seat or pad 62 therein rises because of the removal of the weight of the nozzle therefrom which automatically effects a rising of the valve element 58 in the bore 57 of valve 32 under the influence of spring 60, thereby to effect an opening of the port 51 and also a closing of the vacuum booster whereby full capacity application of brakes results. This complete brake application remains in effect until the return of the nozzle 47 to its clamped position within the receptacle whereupon the vacuum booster is again automatically opened, and the truck is, of course, in a position to be moved upon the release of the emergency brake thereof.

A generally similar arrangement is provided at the loading platform of a fuel truck, all as shown in Figs. 6, 7, 10 and 11 of the annexed drawings. While a valve similar to valve 32 may be employed at the loading station in connection with a relatively short hose connected to the inlet of the tank, I preferably provide a valve 33 of somewhat different type, although it also is a conventional two-way valve and is not claimed herein as my invention, per se. Valve 33 is conveniently mounted on the base of the loading platform 81 of the fuel truck just below the inlet of the tank, not shown; the platform, including a back plate 82 having an opening therein which is in alignment with the tank inlet. Conventional fittings are mounted on the back plate 82 of the platform including a pipe fitting 83 which is threaded at both ends for threaded connection to the inlet of the tank, as well as for removably receiving a threaded coupling 84 to which a loading hose 86 may be detachably connected. The pipe fitting, as shown, passes through an opening of the back plate 82 and is provided with a flange, in order that the same may be bolted in position by means of bolts 87.

In accordance with the present invention, the valve 33 is provided with a handle 88 which, in a normal position of the valve, is disposed directly in front of the coupling 84 at its approximate center, thus serving as an obstruction to the attachment of the loading hose 86 to the coupling. In this position of valve handle 88, the brakes of the truck are not in an applied condition and the truck can be freely moved along a road. In order to permit the connection of the loading hose 86 to the coupling 84 for loading operations, it is necessary to move the handle 88 of the valve 33 to a position free of the coupling 84 or to the position indicated by the showings in Fig. 11. When the handle 88 is thrown to a fully closed position, the vacuum booster lines are closed and full capacity brake pressure is applied to the vehicle brakes 12, which full capacity pressure is maintained on the brakes during the entire period of any loading operation with the host 86 connected to the coupling 84.

As shown, valve 33 comprises a valve body 91 formed of two relatively movable discs including an inner disc having three ports 92, 93 and 94 of which the port 92 is open to the atmosphere, and also including an outer disc 96 having arcuate passages 97 and 98 therein. Conduits 36 and 34', which form an added part of the vacuum booster 15, are connected to the ports 93 and 94, respectively, of the inner disc; the conduit 34' establishing communication between the two valves 32 and 33, as illustrated in Fig. 15, so that a closed fluid circuit is established between pipe connection 21 of the vacuum booster and the two valves 32 and 33 over conduits 34, 34' and 36. The disc arrangement of the valve body 91 of valve 33 is such that relative movement therebetween will effect selective bridging of the arcuate passages 97 and 98 of the outer disc 96 with two of the three ports 92, 93 and 94 of the inner disc. In one of the relative positions of the two discs, a closed fluid circuit is established from pipe connection 21 over line 36 through ports 93 and 94 of valve 33 over line 34' and through valve 32 and back over line 36 to the pipe connection 21. In the other of the relative positions of the discs, the vacuum booster is closed in that atmospheric pressure is admitted behind the piston in the power cylinder 18 since the connections vent to the atmosphere through port 92 of valve 33. In this latter position of the discs, the brakes are applied and the truck cannot be moved until the valve handle 88 of valve 33 is returned to its initial position.

For a loading operation, it is neccessary to move handle 88 away from a position obstructing the pipe connection 83 so that the loading hose 86, with its threaded flange 84, can be coupled to connection 83. As shown in Figs. 6 and 11, a pipe cap or closure 85 is yieldingly carried on the valve handle 88 for normally covering the inlet to pipe connection 83, such closure 85 being carried away with handle 88 as it is moved away from the pipe connection 83. Upon such movement of the handle 88 to a position as illustrated in Fig. 11 and in abutment with stop 101, the vacuum booster lines are automatically closed and the truck brakes are set with full capacity pressure application, and the brakes remain set during loading operations until completed, as well as until after the loading hose 86 has been disconnected and the handle 88 of valve 33 returned to its initial position as illustrated in Figs. 6 and 7. In closing the vacuum booster to set the truck brakes, the valve handle 88 is moved so that the disc 96 is turned with its arcuate passages 97 and 98 bridging the ports 92 and 93 of the inner disc, thus establishing communication between pipe connection 21 and the vacuum booster over conduit 36 to and through valve 33 via ports 93 and 92 to the atmosphere whereby atmospheric pressure is applied in back of the piston in power cylinder 18. Conversely, to render the vacuum booster inoperaive, the handle 88 of valve 33 is returned to a position against stop 102 which effects a turning of the disc 96 so that its arcuate passages 97 and 98 bridge the ports 93 and 94 of the inner disc and the vacuum booster line is thus open in that a closed circuit is established between the pipe connection and to and through both valves 32 and 33 with no atmospheric pressure admitted or applied, and the piston of the power cylinder 18 is held in balanced equilibrium within the power cylinder.

While two different types of two-way valves are herein illustrated for opening and closing the vacuum booster lines of a truck braking system, it is to be observed that these two valves can be similar in all respects, if desired, or other types of two-way valves than those illustrated may be employed within the spirit and scope of this invention for accomplishing the stated purposes.

The herein described automatic safety control system has been succesesfully applied to tank trucks hauling liquefied petroleum and is effective for obviating all hazard of fire by reason of the dispositions of the valves and their connections into the vacuum booster lines of a typical hydraulic braking system on conventional trucks. The inclusion in the system of a specially constructed receptacle which coacts with one of the valves at the delivery or unloading station of a truck provides an increased safety factor in that before a truck can be moved the nozzle of the unloading hose must be clamped in position within the receptacle. Thus, the nozzle of an unloading hose cannot be dislodged from the truck while in motion as has heretofore taken place and the hazard of fire from a trailing unloading hose is completely eliminated.

It is to be understood that the appended claims are to be accorded a range of equivalents commensurate in scope with the advance made over the prior art.

I claim:

1. An automatic safety control system for fuel trucks, said system comprising, in combination with the vacuum booster line of the braking system of a fuel truck including a fuel carrying tank having an inlet and an outlet, a tank loading hose detachably connected to said inlet; said tank loading hose being adapted to be connected to a source of fuel supply, a tank unloading hose carried on said fuel truck and connected to the outlet of said tank; said tank unloading hose being adapted to be placed in communication with a fuel depositary to be filled, and a pair of valves each movable between two different positions and each connected into said vacuum booster line and with one another for closing and opening said booster line to render the same operable and inoperable; one of said valves operating upon being moved to a first position to close said vacuum booster line to increase applied pressure on the truck brakes and to maintain such increase of applied pressure thereon thereby preventing truck movement during the entire period that said loading hose may be connected to said inlet, and being adapted to be moved to a second position for opening said vacuum booster line thereby to remove increased applied pressure on the truck brakes only after disconnection of said loading hose from said inlet; the other of said valves being moved to a first position automatically upon removal of said unloading hose from a truck carrying position to simultaneously close said vacuum booster line thereby increasing applied pressure on the truck brakes and maintaining such increase of applied pressure thereon so as to prevent truck movement during the entire period that said tank unloading hose may be removed from a truck carrying position, said other of said valves automatically being movable to a second position upon replacement of said unloading hose in a carrying position on said truck and simultaneously opening said vacuum booster line to remove the increase of applied pressure on the truck brakes thereby conditioning said truck for movement at the will of the operator.

2. An automatic safety control system for fuel trucks comprising, in combination with a vacuum booster line of the braking system of a fuel truck, including a fuel carrying tank having an inlet and an outlet, a loading hose detachably connected to said inlet, an unloading hose connected to said outlet; said unloading hose being adapted to be placed in communication with a fuel depositary, and a pair of movable valves connected into said booster line whereby said booster line may be opened and closed, an actuating handle on one of said valves; said handle extending in a first position to obstruct said inlet of said tank and being movable to a second position to close said booster line, vacuum means responsive to the closing of said booster line to set the truck brakes, movement of said handle to said second position permitting connection of said loading hose to said inlet, said truck being prevented from movement by reason of its set brakes until after said loading hose is disconnected from said inlet and said handle is moved to its said first position, means normally holding the other of said valves in a first position maintaining said booster line open; said means being automatically actuated to move said other valve to a second position to close said booster line and to effect operation of said vacuum means thereby to set the truck brakes upon removal of said unloading hose from said first position for placment in communication with a fuel depositary; said truck being prevented from movement by reason of its set brakes until after said unloading hose is returned to its first position in said means.

3. An automatic safety control system for fuel trucks comprising, in combination with a vacuum booster line of the braking system of a fuel truck including a fuel carrying tank having an outlet, a movable valve mounted on said truck adjacent to said outlet, actuatable means for automatically moving said valve to automatically close and open said booster line, an unloading hose connected to said outlet and seated on said means to hold said valve in position to maintain said booster line open; removal of said unloading hose from said means to effect an unloading of said tank automatically actuating said means to move said valve to a position to close said booster line, and vacuum means responsive to the closing of said booster line to set the truck brakes, said brakes remaining set to prevent the movement of the truck until said unloading hose is returned to its initial position on said means.

4. In combination with a vacuum booster circuit of an hydraulic braking system of a vehicle and with a nozzle of an unloading hose, a valve connected into said circuit for automatically opening and closing the same, a receptacle for receiving and holding said nozzle, an element movably supported within said receptacle and upon which said nozzle may be seated, linkage connecting said element with said valve; placement of said nozzle on said element within said receptacle effecting actuation of said valve to automatically open said circuit, and removal of said nozzle from said element effecting movement thereof to actuate said valve and to automatically close said circuit, and vacuum means responsive to the closing of said circuit for setting the brakes of the vehicle.

5. An automatic safety control system for fuel trucks comprising, in combination with the vacuum booster line of an hydraulic braking system of a fuel truck, including a fuel carrying tank having an inlet, vacuum means responsive to the closing of said booster line to set the truck brakes, a loading hose detachably connected to said inlet, a movable valve connected into said booster line for closing an opening the same, and a manually operable handle on said valve movable between a first position and a second position for moving said valve from a first setting which opens said booster line and maintains the same open into a second setting which closes said booster line and maintains the same closed; said handle in its first position obstructing the inlet of said tank and preventing the connection of said loading hose to said inlet and in its second position permitting connection of said loading hose to said inlet, said handle being incapable of movement from its second position to its first position until the loading hose is disconnected from said inlet and during the period said handle is in its second position said valve is set to maintain said booster line open thereby maintaining said vacuum means operative and the truck brakes set and thus affording an automatic safety control to prevent movement of the truck when said loading hose is connected to the inlet of said fuel tank.

References Cited in the file of this patent

UNITED STATES PATENTS

| | | |
|---|---|---|
| 1,738,701 | Hanna | Dec. 10, 1929 |
| 2,044,944 | House | June 23, 1936 |
| 2,201,380 | Tierney | May 21, 1940 |
| 2,569,771 | Mitchell | Oct. 2, 1951 |
| 2,707,577 | Trotter | May 3, 1955 |